Patented Feb. 12, 1929.

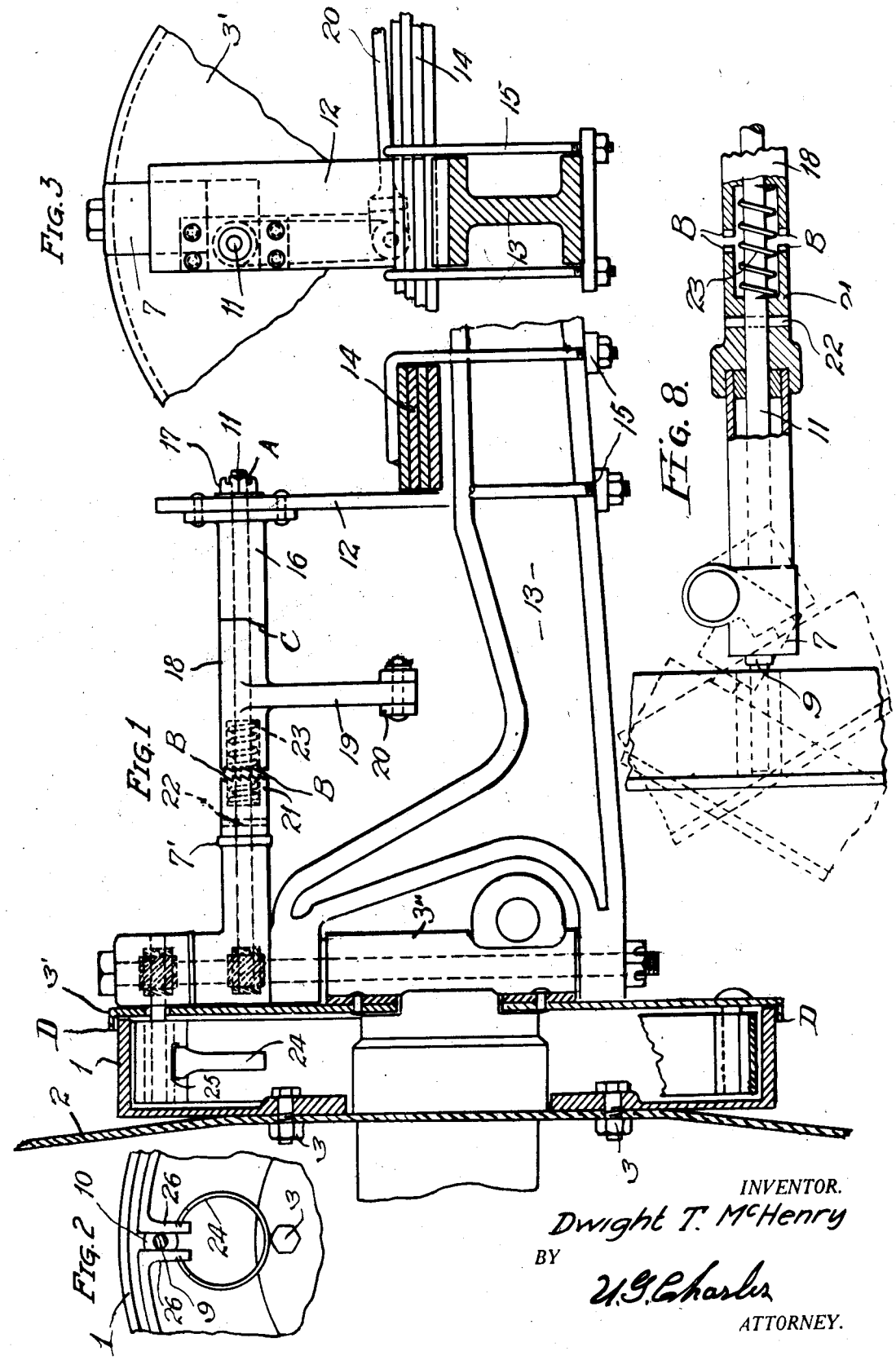

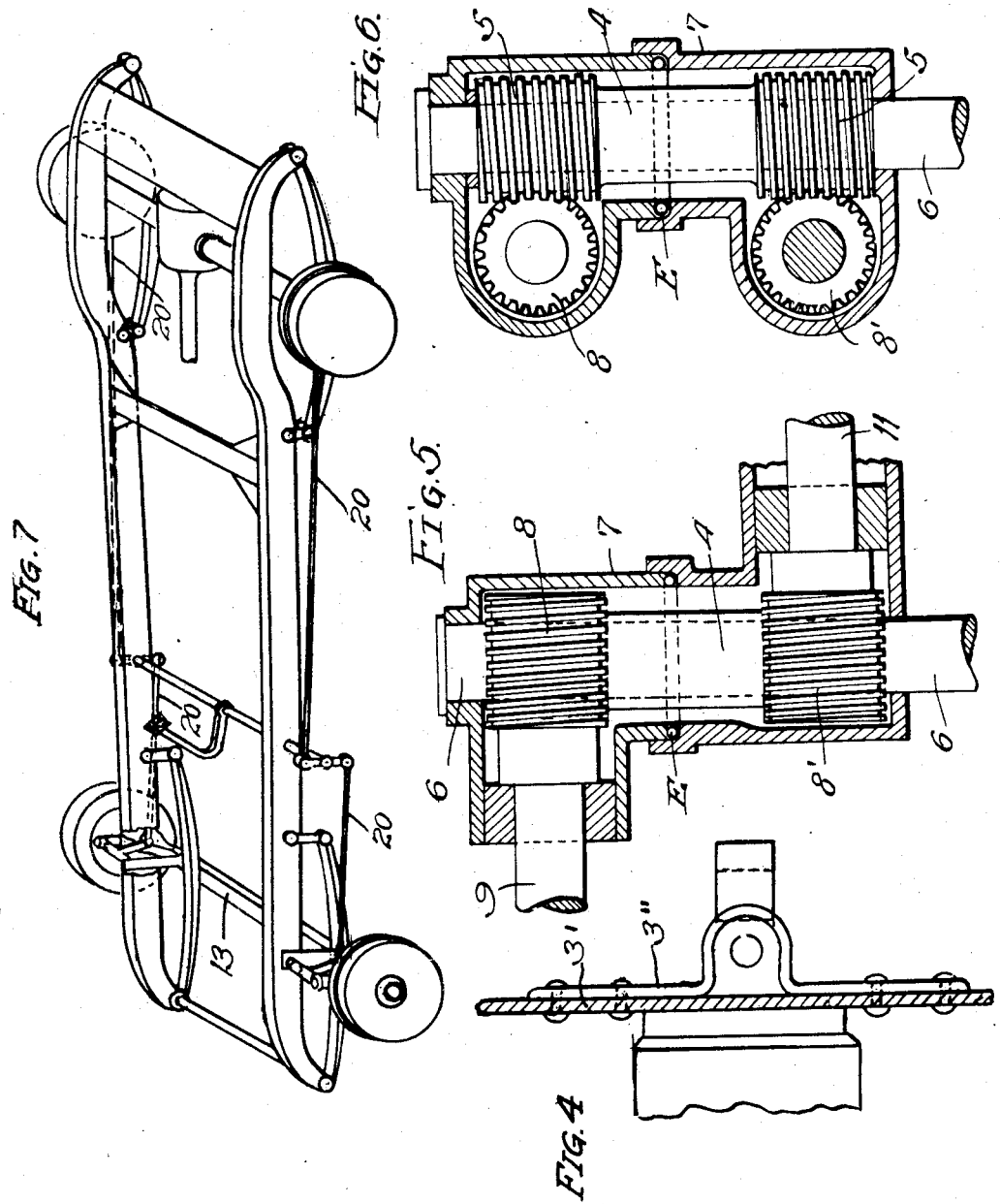

1,701,504

UNITED STATES PATENT OFFICE.

DWIGHT T. McHENRY, OF TOPEKA, KANSAS.

STEERING-WHEEL BRAKE FOR VEHICLES.

Application filed November 6, 1926. Serial No. 146,776.

My invention relates to steering wheel brakes to be applied to motor driven vehicles.

The object of my invention is to provide a brake operating means that will function on the two front and rear wheels of the vehicle simultaneously.

A further object of my invention is to provide a brake operating means that is inexpensive and may be applied to any standard make of automobile.

A still further object of my invention is to provide a brake operating means that can be applied to the front or steering wheels and operate in conjunction with the present brake on the rear wheels of an automobile.

A still further object of my invention is to provide a brake operating means that will not engage automatically when the steering wheels are directed at an angle relative to the body or chassis of the vehicle and made to function with equal capacity.

These and other objects will hereinafter be more fully explained.
Referring to the drawings:

Fig. 1 is an elevation showing the application of the brake actuating means as applied to the front wheels of an automobile, parts removed for convenience of illustration.
Fig. 2 is a transverse view of a fragmentary part of the brake drum and shoe showing the spring tensioning means for the shoe.

Fig. 3 is an end view of the brake mechanism showing the manner of attaching the bracket to the axle.

Fig. 4 is a plan view of the spindle showing the manner of attaching the brake shoe supporting disc to the spindle.
Fig. 5 is an enlarged elevation of the worm gears employed to rotate the brake shoe expander, the housing being in section.

Fig. 6 is a transverse view of Fig. 5.

Fig. 7 is a perspective view of the chassis of an automobile showing the proposed application of the brake actuating rods and foot lever.

Fig. 8 is a plan view of the brake actuating means, partly in section for convenience of illustration, and showing the extreme rock of the steering wheel (by dotted lines) carrying with it the brake expanding member and its respective housing.

The mechanism herein disclosed pertains more particularly to a train of worm gears trunnioned in a swivelled housing and means for actuating the gears. The swivelled feature of the housing is to accommodate for the angle of the steering wheels relative to the axle. The description will refer to one of the brake mechanisms as applied to one of the steering wheels of a vehicle; however it will be understood that the same mechanism applies to both steering wheels and may be applied to the drive or rear wheels.

In Fig. 1 is shown a brake drum 1 attached to what is commercially known as a disc wheel, a fragmentary part thereof being shown at 2. The drum is rigidly attached by means of a bolt 3, other means however may be employed. The drum may also be attached to the spokes of an ordinary wheel by standard connecting means not shown in the drawings.

The brake shoe is rigidly supported independently by means of a disc 3' which is attached to the spindle by a strap 3'' securely attached and looping around the apertured portion of the spindle through which the spindle bolt engages. On the peripheral edge of the disc is a flange D adapted to engage over the open side of the drum as inclosing means therefor.

The brake actuating mechanism consists of a vertically positioned sleeve 4 having a worm gear 5 on both ends thereof and integral therewith, the said sleeve adapted to rotate freely on the spindle bolt 6 which extends through the housing 7 in which is trunnioned transversely positioned gears 8 and 8', the said housing being in two parts having a ball bearing as at E functioning as a swivel. A shaft 9 is rigidly attached to the gear 8, and on the opposite end thereof is an expanding member 10 for the brake shoe. The shaft 11 to which gear 8' is rigidly attached is trunnioned at its opposite end by a bracket 12, the said bracket being attached to the axle 13 by placing the right angle bend thereof between the springs 14 and said axle and bound firmly by means of the clamps 15 which is the usual attaching means. Rigidly attached to the upper end of the bracket is a sleeve 16 through which the said shaft 11 engages axially, and rotatably carried thereby. The said shaft is secured by a nut 17 threadedly engaging on the outer end thereof, the said nut having ways as at A to engage with a cotter pin as a locking means.

Revolvably mounted on the shaft 11 is a sleeve 18 having an arm 19 transversely and centrally positioned thereon. The outer end of the arm is adapted to pivotally connect with a brake rod 20 as reciprocating means for the sleeve which is the actuating means for the brake operation hereinafter described.

On the shaft 11 is rigidly attached a sleeve 21 by means of a pin 22 diametrically positioned, the joint between the said sleeve and housing 7 being at lip 7', which laps over the end of said sleeve as protecting means for the joint. The end of said sleeve is toothed as at B and adapted to engage with similar teeth on the end of the sleeve 18, the said teeth being separated by a coil spring 23 which is seated in the adjacent ends of said sleeves. As a means for engaging the teeth, I have provided a cam on the adjacent ends of sleeves 16 and 18 as shown at C. It is now readily seen that when the sleeve 18 is rotated by the foot brake mechanism the teeth will engage functioning as a clutch rotating the shaft 11 transmitting the rotation of the expanding member 10 through the medium of the worm gears 5, 8 and 8'. When the brake is released the teeth will separate as shown in Fig. 1, the sleeve 18 returning to its normal position as shown.

By the disengagement of the teeth the steering wheels are free to turn to an angle relative to the axle without interrupting the brake lever. While being positioned at an angle the brake may be applied actuating the expansion of the shoe with equal capacity as when the wheels are in straight alignment with the chassis.

The turning of the wheels will cause the gears 5 to revolve which in turn revolve the shaft 11 without interrupting the brake levers as the said shaft is free to turn in the sleeves 18 and 16. Being a plurality of the teeth the lost motion in applying the brake consists merely of the length of the individual teeth when they are brought to engagement.

As a means to contract the brake shoe when the brake actuating means is released I have provided an annular spring 24, the ends of which seat in notches 25 positioned in the laterally extending ends 26 of the brake shoe.

Attention is now directed to the action of the brakes. When the foot lever is pushed forward the rear brakes will take action a moment prior to the front brakes which is preferable, the action being due to the cam actuated clutch on the front brake operating means.

The mechanism herein disclosed may be applied to the rear brakes eliminating the clutch feature, otherwise it will remain the same and the prior action of the rear brake will be the same as when other styles of brake actuating means are employed.

Such modifications may be employed as lie within the scope of the appended claims.

Having thus described my invention, what I claim as new and desire to secure by Letters Patent is:—

1. In a steering wheel brake for a vehicle, in a brake actuating means of the kind described, a shaft having a clutch positioned thereon, a spring for separating the jaws of the clutch when the brake is normally disengaged to allow one member of the clutch to rotate when the wheel is being rocked on the spindle bolt, a cam to engage the clutch when the brake is being exercised.

2. In a steering wheel brake for a vehicle, in a device of the kind described, in combination with a wheel and its axle, a brake drum rigidly attached to the wheel, a break shoe attached to the spindle, a swivelled housing having a sleeve with a worm gear on each end thereof and integral therewith and rotatably mounted therein, the said sleeve in axial alignment with and rotatably mounted on the spindle bolt, a pair of worm gears in mesh with first said gears, one of last said gears to operate the brake shoe, the other operated by the foot brake lever imparting movement to the brake shoe gear through the medium of the sleeve gears, a cam operated clutch and means for operating the same to actuate the brake when the steering wheel is positioned at an angle relative to the axle or chassis of the vehicle.

3. In a steering wheel brake for a vehicle, in combination with the axle, the spindle and the wheel of a vehicle, a brake drum rigidly attached to the wheel, a disc rigidly attached to the spindle, a brake shoe within the drum and being carried by the disc, a train of worm gears to actuate the brake shoe, said gears trunnioned in a swivelled housing and pivotally carried by the spindle bolt, a bracket attached to the axle, a shaft trunnioned in the bracket and the housing, the shaft connecting with one of the worm gears transmitting power through the other gears, toothed sleeve rigidly attached to the shaft, the teeth being on the end thereof, a sleeve having a laterally extending arm to connect with the brake rods, a toothed sleeve having a laterally extending arm and rotatably carried on the shaft, the teeth being on the adjacent end to the first said toothed sleeve so that the toothed portion of both will engage functioning as a clutch, a spring positioned between the toothed ends of the sleeves as separating means for the teeth, a cam on the opposite end of the last said sleeve as engaging means of the teeth when the said sleeve is rocked, means for rocking the said sleeve by a foot lever.

4. In a steering wheel brake for a vehicle, in combination with a brake drum and shoe of a steering wheel for a vehicle, a housing vertically positioned and trunnioned on the spindle bolt of the steering wheel, a bolt bearing swivel for the housing, a sleeve having a worm gear on both ends thereof, the said sleeve rotatably mounted on the spindle and within said housing, an expanding member having a worm gear trunnioned in one end of the housing and in mesh with one of the first said gears as actuating means for the brake shoe, a shaft having a worm gear trunnioned in the opposite end of the housing and in mesh with the other of the first said gears, a bracket having a sleeve supporting the outer end of the last said shaft, a sleeve rotatably mounted on the shaft, a laterally extending arm integral with the sleeve to connect with the brake rod, a foot lever and connecting rods to actuate the reciprocation of the arm, a cam on one end of the sleeve, and a series of teeth on the other end, a sleeve rigidly connected to the shaft having a series of teeth on the end thereof adjacent to and adapted to engage with the first said teeth as actuating means for the shaft when the brake is applied.

5. In a steering wheel brake for vehicles, in combination with a brake drum and a brake shoe, a sleeve having a worm gear on each end thereof, the sleeve rotatable carried by the spindle bolt, a shaft having an expanding member on one end to engage the brake band and a worm gear on the opposite end in mesh with the upper worm gear of the sleeve, a shaft having a worm gear in mesh with the lower gear of the sleeve, and a bracket to rotatably engage the opposite end of the shaft, a jointed housing for the upper sleeve gear and the gear in mesh therewith, and a housing for the lower gear of the sleeve and its respective gear and shaft, the first said housing rockable engaging on the last said housing through the medium of the steering wheel, a toothed member rigidly attached to the last said shaft, and a member rockably engaging on the shaft, last said member having teeth on one end and a cam on the other end and an arm intermediately positioned and laterally extending, the arm to pivotally engage with a brake rod, a member rigidly attached to said bracket and having a cam on the outer end thereof to engage with the cam of the second said member, and a coil spring as separating means for the teeth on the first and second said members, the cam adapted to cause the teeth to engage when the arm is rocked, by which means the last said shaft is turned, actuating the brake, all substantially as shown.

DWIGHT T. McHENRY.